US011369894B1

(12) United States Patent
Lee et al.

(10) Patent No.: US 11,369,894 B1
(45) Date of Patent: Jun. 28, 2022

(54) ONLINE FUEL CUTPOINT CONTROL APPLICATION USING COLOR SPECTRUM

(71) Applicant: PHILLIPS 66 COMPANY, Houston, TX (US)

(72) Inventors: Hyunjin Lee, Katy, TX (US); Anna Helena Wolna, Bartlesville, OK (US)

(73) Assignee: Phillips 66 Company, Houston, TX (US)

(*) Notice: Subject to any disclaimer, the term of this patent is extended or adjusted under 35 U.S.C. 154(b) by 0 days.

(21) Appl. No.: 17/324,672

(22) Filed: May 19, 2021

(51) Int. Cl.
| | |
|---|---|
| B01D 3/42 | (2006.01) |
| C10G 7/12 | (2006.01) |
| B01D 3/32 | (2006.01) |
| B01D 53/02 | (2006.01) |

(52) U.S. Cl.
CPC ............... *B01D 3/42* (2013.01); *B01D 3/324* (2013.01); *C10G 7/12* (2013.01); *B01D 53/025* (2013.01); *C10G 2300/4081* (2013.01); *C10G 2400/02* (2013.01); *C10G 2400/04* (2013.01); *C10G 2400/06* (2013.01); *C10G 2400/08* (2013.01)

(58) Field of Classification Search
CPC ........ B01D 3/42; B01D 3/324; B01D 53/025; B01D 3/14; B01D 3/22; B01D 3/32; C10G 7/12; C10G 2300/4081; C10G 2400/02; C10G 2400/04; C10G 2400/06; C10G 2400/08
See application file for complete search history.

(56) References Cited

U.S. PATENT DOCUMENTS 10,758,839 B1 * 9/2020 Lantz .................... G01J 3/0202

FOREIGN PATENT DOCUMENTS

CA          2397555       *  7/2021

OTHER PUBLICATIONS

ASTM International Designation: D 1500-12, Designation: 196/97, Standard Test Method for ASTM Color of Petroleum Products (ASTM Color Scale), 5 pages.
ASTM International Designation: D 1500-07, Designation: 196/97, Standard Test Method for ASTM Color of Petroleum Products (ASTM Color Scale), 5 pages.

* cited by examiner

*Primary Examiner* — Randy Boyer
*Assistant Examiner* — Juan C Valencia
(74) *Attorney, Agent, or Firm* — Phillips 66 Company

(57) ABSTRACT

The present disclosure describes a fractional distillation tower that uses color sensing technology that provides nearly real time cutpoint analysis of high value products. With this information, the cutpoints may be aggressively shifted to a financially advantageous product slate and stay aggressive throughout each day rather than wait for a once or twice daily report of what products have been made and their analyses with respect to specifications.

6 Claims, 2 Drawing Sheets

ONLINE FUEL CUTPOINT CONTROL APPLICATION USING COLOR SPECTRUM

CROSS-REFERENCE TO RELATED APPLICATIONS

None.

STATEMENT REGARDING FEDERALLY SPONSORED RESEARCH OR DEVELOPMENT

None.

FIELD OF THE INVENTION

This invention relates to cutpoint control of distinctive hydrocarbon distillation fractions in a distillation tower or other fractionation system where crude hydrocarbon streams are roughly separated by boiling temperature of the various hydrocarbon species. Such fractions include naphtha, jet fuel, diesel and gas oil among others where each such cut is directed to a different market and there is overlap at the margins where certain species of hydrocarbons end up in more than one cut.

BACKGROUND OF THE INVENTION

The refining of crude oil goes back more than 150 years and the basic goal of all refiners has long been basically the same: take crude oil and separate it efficiently into its distillation fractions where the separation delivers as much of the raw material toward the highest value fractions as practical. Currently the highest value, large volume products are gasoline, diesel fuel and jet fuel. Over the years, as product specifications for gasoline and diesel fuel have been enhanced and tightened, the cutpoints for each fraction are more tightly monitored to stay within specification. Producing gasoline, diesel or jet fuel outside of the specifications is not profitable and it can be quite costly and time consuming to fix. Typically, the process of fixing requires blending with higher value products that are sufficiently within the specifications that they can tolerate the addition of off specification materials and the combined volume meets the specifications.

The process for verifying that the products are meeting specifications includes periodically drawing samples out in the refinery, bringing the samples to a laboratory and measuring the attributes of the samples with a gas chromatograph analyzer. Typically, this is done once or twice per day. Once a sample is collected and returned to the lab, it takes about 10 or more minutes before each result is obtained. It is not uncommon for the samples to be held for a period of time to cool or to await the testing of other samples. Since the fractionation process is subject to weather variations, crude oil variations, and the normal vagaries of large scale industrial processes, the target operational settings for making rough-cut separations are established and revised with a view toward always meeting specifications, but seeking to maximize the volumes of gasoline, diesel and jet. With an opportunity to fine tune the operational settings arising only once or twice per day combined with the reality that one or more off-specification products may be produced for an extended number of hours it is understandable that the most aggressive settings are not undertaken. And while fine tuning is needed, maximum throughput is a very important objective also.

To be clear, there are thousands of species of hydrocarbons in crude oil and hundreds that are clearly suited for the higher-value refining products. And there are dozens of species have attributes that make them suitable in two or more different product pools where at least one is a more profitable product and the other is a lower profit product. Additionally, there are dozens of additional species that have attributes that make them most suitable for one lesser value product, but are acceptable in a higher value product as long as there are sufficient numbers of offsetting species in that cut so that the combined volume within that cuts results in a higher volume of higher profit products. Each of the distillation fractions are believed to have a ten to fifteen percent overlap at their margins which presents a substantial opportunity to both increase profits and to miss out on profit opportunities. The margin for error could be smaller or tighter if testing, measuring and verification could be practically provided in tighter time intervals or more often to provide more opportunity to set more aggressive settings and then correct and adjust without significant cost and labor burdens

BRIEF SUMMARY OF THE DISCLOSURE

The present embodiment more particularly relates to a system for distilling hydrocarbon products from a hydrocarbon stream based on boiling points of components within the hydrocarbon stream, where the system includes a heating device to heat the hydrocarbon products to a predominantly vaporous stream of hydrocarbons and a fractional distillation tower with a plurality of vertically spaced apart trays and drains for draining condensed liquid hydrocarbon fractions from at least two of the trays. Heat exchangers included for altering the temperature of at least a portion of the liquid hydrocarbon fractions collected from the at least two drains and a recycling line is provided to feed at least a portion of the temperature altered hydrocarbon fractions back into in the fractional distillation tower as reflux to help maintain a temperature gradient within the fractional distillation device. At least two light absorption monitors are arranged to measure the light absorption in at least the two drained liquid hydrocarbon fractions and provide the measurement on a continual basis to operators of the system and the system includes controls to alter the selectivity of the predominantly vaporous stream between at least two fractions based on the light absorption measurements of the two drained liquid hydrocarbon fractions.

BRIEF DESCRIPTION OF THE DRAWINGS

A more complete understanding of the present invention and benefits thereof may be acquired by referring to the following descriptions taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
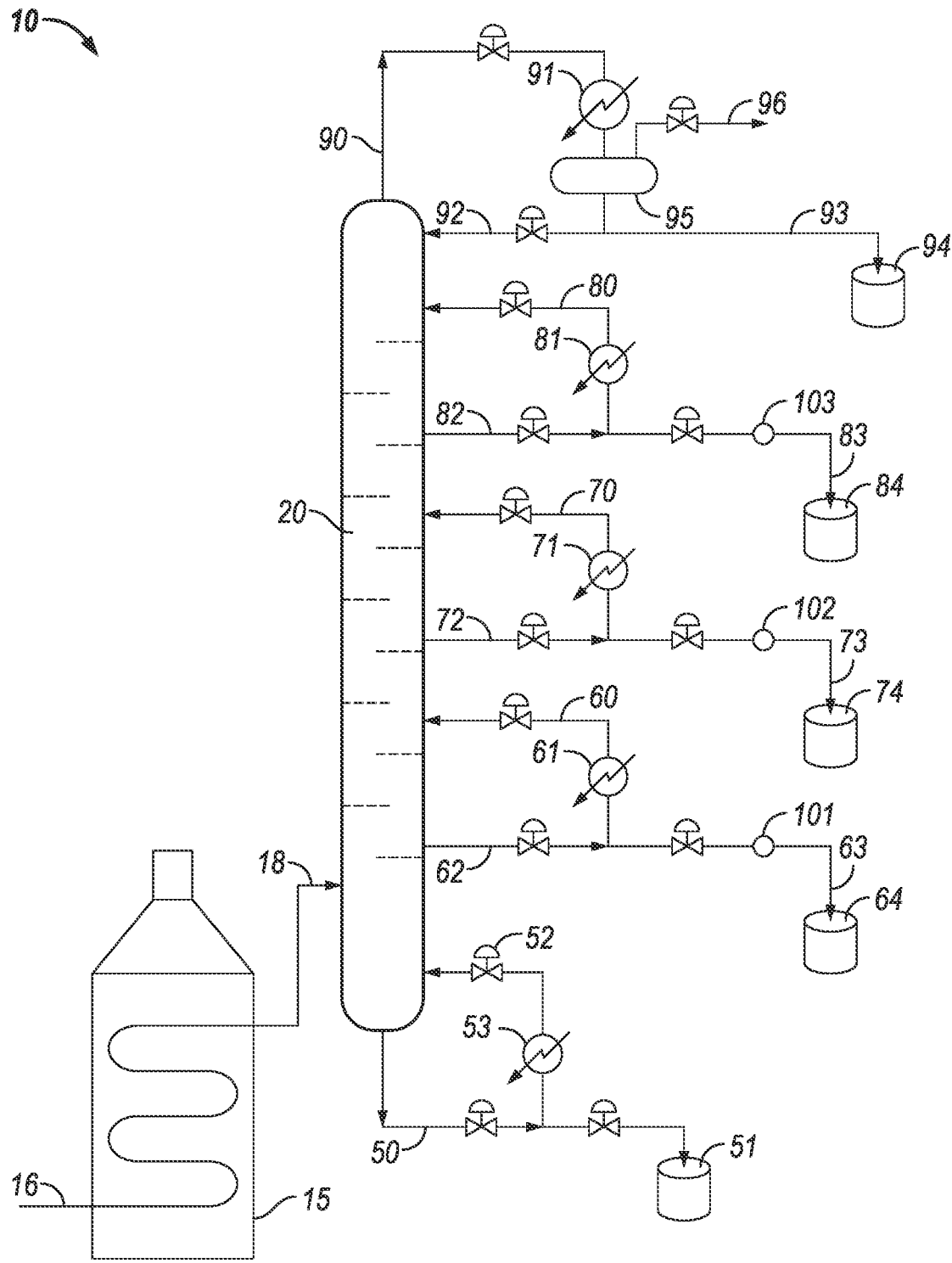
FIG. 1 is a diagram of a hypothetical fractional distillation tower and furnace illustrating a first embodiment of the present invention.

Crude oil that is refined into finished fuels or other products typically passes through a number of processes and treatments, but the refining process basically starts with the step of making a rough-cut separations of the crude oil into its various distillation fractions. This is done in a crude fractionation tower after the crude oil is basically heated to a temperature of about 650~680 degrees Fahrenheit. Such a rough-cut process is shown in the drawings as a fractionation system 10 as seen in FIG. 1.

The fractionation system 10 includes a furnace 15 which receives crude oil via crude pipe 16 from a pipeline but more typically from a crude oil storage tank. Most refineries start with a blended crude that is a combination of different crudes from different fields or regions to create a feedstream for the refinery having a combination of constituents that best fit with the design of the refinery. Refineries with substantial capacity to refine extra heavy crudes procure such heavy crudes and blend them with enough medium and lighter crudes to best fit the refinery design while refineries that are designed for lighter crudes will procure and blend crudes having a lower proportion of heavy components. Heavier crudes tend to be lower cost crudes, so a highly profitable refinery seeks the heaviest crudes within the refineries capability to produce the highest total volumes of the most valuable products. In the furnace 15, the crude oil is heated to temperature at which most of the crude oil is in a vapor form and delivered to a fractionation tower 20, sometimes described as a crude unit, via line 18.

Figure 2:
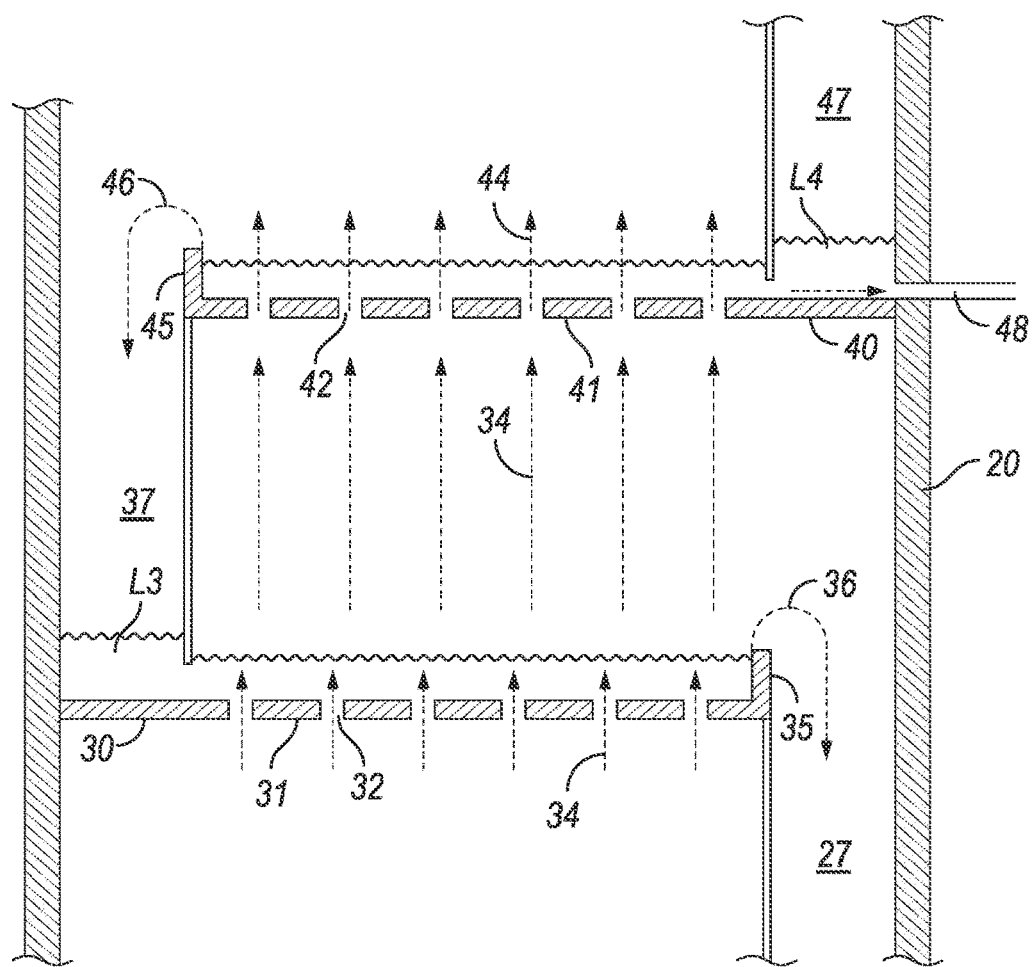
FIG. 2 is a fragmentary view of two trays within a fractional distillation tower.

Within the fractionation tower 20 there are quite a number of horizontal trays arrayed spaced apart vertically where some trays are draw trays where the rough-cut fractions are drawn from the tower. Turning to FIG. 2, two representative trays 30 and 40 are shown with liquid pools L3 and L4 filling each of the trays 30 and 40, respectively, with a volume of hydrocarbon liquid. Each tray is shown with a tray floor 31 and 41 and with a plurality of through-holes 32 and 42. Vapor rises in the column from below each tray may pass through the holes 32 and 42 in the trays up and progress up through the liquid pools L3 and L4 and progresses up toward the next higher tray. The path of the vapor through the trays is indicated by arrows 32 and 44. The depth of the liquid pools L3 and L4 are set by the weirs 35 and 45. As more liquid condenses or falls into the trays, excess liquid will drip over the weirs 35 and 45 as shown by arrows 36 and 46 to fall to the next lower tray. Liquid is also drawn from some draw trays via a product line such as shown at line 48 from draw tray 40. Once the crude is heated in the furnace, additional heat is not typically added to the system. The liquid in the trays are cooled by recycling liquids that have been drawn from the product line 48, cooled outside the tower 20 and returned via a reflux line to a higher level within the tower 20. That process of cooling and recycling is more clearly shown in FIG. 1 and will be better explained below but helps create a temperature gradient going up the tower 20.

Turning back to FIG. 1, the tower 20 can be seen to have several vertical operational sections where rough-cut products are withdrawn into receivers 51, 64, 74, 84 and 94 (looking at the tower from the bottom toward the top). These operational sections include a drain line or conduit, an arrangement for cooling of some of that liquid and return the same to a tray at a higher elevation in the tower 20. The cooled liquid will then have the most cooling impact on that first tray and then progressively less cooling effect on each of the trays there below. The result is that species forming a liquid in a tray will progress down to a tray where it will be withdrawn into the appropriate drain. And species that boil at a lower temperature will re-vaporize progress upwardly in the tower 20 until it reaches a tray at which it will condense again. For example, referring to FIG. 2, tray 40 would essentially be maintained at a slightly cooler temperature compared to tray 30 by the progressive overflow from above comprising some amount of cooled liquid at one or more locations higher in the tower 20.

This conventional fractionation process can separate large volumes of crude oil into the rough-cut fractions by maintaining the temperatures of the trays somewhat near to the fractionation temperatures of the desired products. There is, of course, an offsetting balance between high throughput and the sharpness of the rough-cut of the liquid hydrocarbon products where both productivity and selectivity are desired.

Turning back to FIG. 1, the product streams are drawn from different points vertically in the fractionation tower 20 starting basically near the bottom where the hot vaporous crude oil enters the fractionation tower 20 from line 18 to begin progressing up the tower 20. Hydrocarbons that are liquids at such hot temperatures tend to be the larger and heavier molecules with a very high boiling temperature that tends to fall to the bottom of the tower 20. This residual material tends to have low value and is taken from the tower by drain 50. It is delivered to residue tank 51 but may be recycled back into the tower 20 by reflux line 52 after additional heat is added at reboiler 53. The additional heat may liberate light components dissolved in the heavy molecules to let them ascend in the tower 20 and be gathered with the higher value fuels. Separately from this fractionation step, there are many processes for cracking the residue into smaller molecules that will eventually be blended in with higher value streams after such cracking and other treatment.

Progressing upward in the tower 20, a draw of hydrocarbons is taken at drain 62. This hydrocarbon product is a heavy distillate that is at the heavier end of the crude oil spectrum but is lighter than the residue generally described as a gas oil. The boiling point of gas oil is less than the temperature at which the vaporous crude oil enters the tower 20. Maintaining the tray or trays associated with drain 62 at the desired temperature is done be cooling the withdrawn gasoil liquid, cooling it in the heat exchanger 61 and returning some back to the trays via reflux line 60. Slightly cooler reflux liquid counters the continual heating by the hot vapors passing upwardly through the trays. Gas oil is also delivered by line 63 to gas oil receiver 64.

A further draw of hydrocarbons is taken at drain 72 where middle distillates like diesel and jet would condense. The trays at this draw would similarly be maintained at the desired temperature for middle distillates by cooling the withdrawn diesel and jet range liquid, cooling it in the heat exchanger 71 and returning some back to the trays via reflux line 70. Diesel and jet range product is delivered by line 73 to middle distillate receiver 74. And again, the vapors passing through the trays at this level of the distillation tower 20 would be cooled making them more easily condensed in the next higher levels of the tower 20.

A next further draw of hydrocarbons in this hypothetical distillation tower 20 is taken at drain 82 where a lighter distillate like gasoline and naphtha would condense. The trays at this draw would similarly be maintained at the desired temperature for lighter distillates by cooling the withdrawn gasoline and naphtha range liquid in the heat exchanger 81 and returning some back to the trays via reflux line 80. Gasoline and naphtha range product is delivered by line 83 to lighter distillate receiver 84. And again, the vapors passing through the trays at this level of the distillation tower 20 would be cooled making them more easily condensed in the next higher levels of the tower 20.

The upper reaches of the hypothetical distillation tower 20 are where the light ends are found. Natural gas liquids such as propane, butane and pentane are recovered here and separated from methane and ethane. The gases and vapors being taken from vent line 90 are cooled by heat exchanger 91 and delivered into a gas liquid separator 95. The liquids drain from the bottom of the separator 95 and a portion are recycled back into the tower 20 as reflux via line 92 and the remaining liquid portion going through line 93 to NGL receiver 94. The gases from separator 95 may be further processed or used as fuel in the refinery.

The operation of the fractional distillation tower 20 can be controlled via a number of operational settings such as the flow through the heat exchangers 53, 61, 71 81 and 91 to alter the functional temperatures of each, the rates at which the reflux liquids are recycled back into the tower 20. This can be controlled by valves positioned in the various lines as shown in the drawings but not numbered. The rate at which the heated crude is delivered, and gases are released from the top of the tower can be altered which alters the performance and cutpoints of the various products. Another potential adjustment is fuel delivery rate into the furnace to thereby alter the temperature of the heated crude oil. And there are other settings known in the art that may be altered to adjust the performance of the tower 20. These adjustments tend to be quite dynamic whereby a small adjustment in one setting or flow rate may very well alter various production rates and product attributes throughout the entire operation.

As pointed out above, samples of the various products are analyzed using gas chromatography (GC) once or twice per day. This is a somewhat laborious and not inexpensive process. Focusing again on FIG. 1, light absorption sensors or color sensors 101, 102, and 103 are shown to have been placed in the product lines 63, 73 and 83. Such devices are relatively low cost to buy, install and operate. These light absorption sensors are not a substitute for the once or twice daily gas chromatography analysis but provides helpful information as to the performance of the tower 20 between GC tests and in either real time or in very near real time. For example, it is anticipated that the light absorption sensors will have their own variability one from another and for the duration of its life where an older light source may emit a slightly different range of wavelengths than a newer light source. The GC provides the most accurate measurement of the hydrocarbon liquids relative to the specifications of marketable products. The GC is therefore the calibrating device for the light adsorption sensors and the light adsorption devices are essentially calibrated once or twice per day so that age of the sensor or light source is zeroed out.

Figure 3:
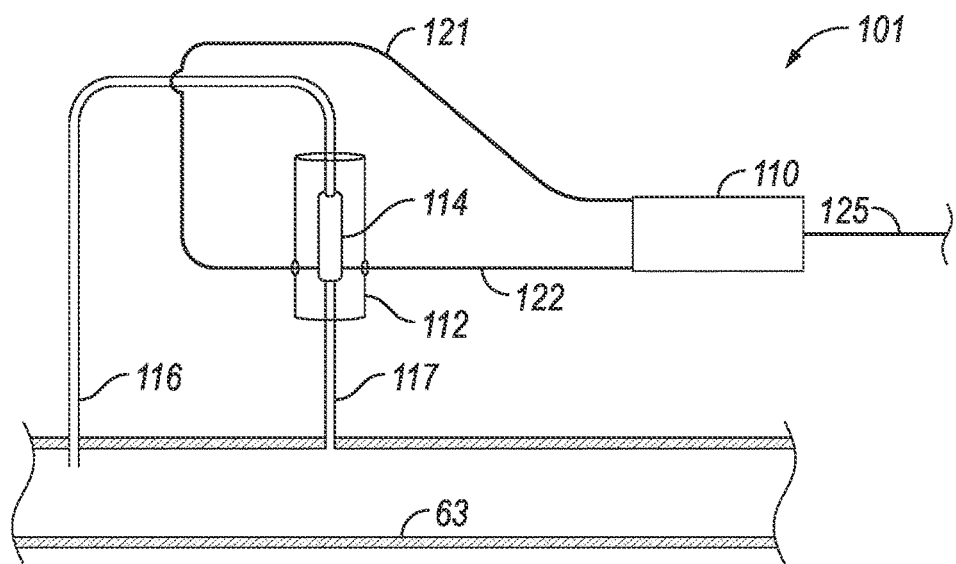
FIG. 3 is an enlarged fragmentary view of an online light absorption analyzer arranged to provide precise color data of a refinery product.

Referring now to FIG. 3 where light absorption sensor 101 is a system is arranged to monitor the color or light absorption of the product flowing through line 63. The light absorption sensor 101 includes and analytical device 110 that is connected by a pair of fine fiber optic wires 121 and 122 to a sample vessel 112. Within the sample vessel 112 is a translucent chamber 114 with the fiber optic wires 121 and 122 positioned on opposite sides of a side stream of the product. One of the fiber optic wires directs light into the liquid product inside the translucent chamber 114 and the other fiber optic wire is arranged to gather or collect light passing through the product. The analytical device 110 processes the difference between the light input and light output to determine the color with double precision thereby assigning a number that identifies with considerable particularity, the color or light absorption index of the product. The absolute number of this absorption number is not the key, but rather, it is important to identify changes from one measure to the next and the degree of any changes in the product make up as it is being directed through line 63 to the product receiver. It is a side stream that is pulled continuously or at least routinely from line 63 via tube 116 and delivers the sample to the sample vessel 112. The sample is returned to line 63 via tube 117. It is noted that the light absorption measurement is delivered to the refinery control center via wire 125 for the refinery operations staff to use for determining whether an adjustment to the valving and other operational parameters are appropriate and to what degree. The other light absorption sensors 102 and 103 are configured in a similar manner.

Naphtha, gasoline, kerosene, diesel, and light gas oil all have distinct colors that are different from one another and thereby can be quite precisely discerned by light adsorption sensors. The colors of hydrocarbon liquids progress from a light yellow or amber at the lighter end such as gasoline and naphtha, gets progressively more orange or brown colored as the liquids are heavier. Residue is essentially black but has a low market value. Online color analyzers provide real time information and would quickly reveal a concerning product quality deviation. As such, the operation of the tower may be operated closer to the edges for specifications to favor selection of higher value products. The system 10 can be set to produce a greater portion of the previously described 10-15% overlap into the highest value product knowing that the risk is lower for missing specifications for the target products. An upset or deviation will be recognized more quickly and remedied more quickly. It should be also recognized that the prices or values of the various products are also changing throughout the day or at least day to day and the ability to rapidly shift to different cut-points between any two streams or draws at the fractional distillation tower 20 may provide a further competitive advantage to a refinery optimizing the financial performance by adding the agility to simply respond to price movement and not just to fluctuations in operations.

ASTM publications D156 and D1500 describe measurements for the visible color definition for oil and petrochemical products pretty much describing the midpoints for each cut. These descriptions focus on the basic colors of the various refinery products. Using a highly precise color discrimination for finer boiling point control on refinery plant units is using color distinctions on a scale much finer than set out in the publications. The lightest products and the lowest cuts are generally not amenable to using color gradient in that the lightest cut is essentially clear and the heaviest cut is totally black and opaque.

It is certainly be practical to use the light adsorption sensors to create models for more directly controlling refinery operations, but operator interpretation of data and operator inputs will most likely continue as color assessments may not necessarily tell the whole story. Moreover, there are several distillation operations within a refinery downstream of the initial crude oil fractionation processes. As such, there are many opportunities to use color gradient data for optimizing performance and productivity.

As noted above, the light adsorption sensors are relatively low cost to buy, install and operate. On the other hand, conventional gas chromatography (GC) systems require considerable engineering and costs to install and operate. Typically, those costs are distributed over samples from a great variety of sources and needs to be used regularly to justify those costs rather than have a dedicated GC for managing just a few streams or systems. In this invention, a color spectrum analyzer is installed directly in a unit in the field and basically attached to existing piping. The effort involved for installing the color spectrum analyzers is far less involved and can be completed in about one third or one fourth the time for a GC installation. All analyzers need routine maintenance work for consistent reliability and accuracy. A typical GC analyzer costs a million dollars per year for maintenance including the skilled labor, supplies, and parts.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A system for distilling hydrocarbon products from a hydrocarbon stream based on boiling points of components within the hydrocarbon stream, where the system comprises:
   a) a heating device to heat the hydrocarbon products to a predominantly vaporous stream of hydrocarbons;
   b) a fractional distillation tower with a plurality of vertically spaced apart trays and drains for draining condensed liquid hydrocarbon fractions from at least two of the trays;
   d) heat exchangers for altering the temperature of at least a portion of the liquid hydrocarbon fractions collected from the at least two drains;
   e) a recycling line to feed at least a portion of the temperature altered hydrocarbon fractions back into in the fractional distillation tower as reflux to help maintain a temperature gradient within the fractional distillation device;
   f) at least two light absorption monitors arranged to measure the light absorption in at least the two drained liquid hydrocarbon fractions and provide the measurement on a continual basis to operators of the system; and
   f) controls for operators to alter the selectivity of the predominantly vaporous stream between at least two fractions based on the light absorption measurements of the two drained liquid hydrocarbon fractions.

2. The system according to claim 1 where the controls for altering the selectivity more particularly comprises at least one of: valving for altering the rate of recycling the reflux back into the fractional distillation device; valving for altering the temperature to which the reflux is cooled; valving for altering the temperature of which the predominantly vaporous stream of hydrocarbons are provided to the fractional distillation device; and valving for altering the rate at which the drained liquid hydrocarbon fractions are drained from the fractional distillation device.

3. The system according to claim 1 further including a gas chromatography device to measure and validate the actual specifications of the products made as monitored by the light absorption measurements.

4. The system according to claim 1 further including at least a third light absorption monitor arranged to measure the light absorption in at least one other drained liquid hydrocarbon fraction and provide that measurement on a continual basis to operators of the system.

5. The system according to claim 4 further including at least a fourth light absorption monitor arranged to measure the light absorption in at least one other drained liquid hydrocarbon fraction and provide that measurement on a continual basis to operators of the system.

6. The system according to claim 1 wherein at least one of the heat exchangers is arranged to cool at least one of the portions of the liquid hydrocarbon fractions.

* * * * *